March 25, 1958
H. E. BRELSFORD
2,827,800
SAFETY CONTROL PEDAL
Filed July 5, 1956
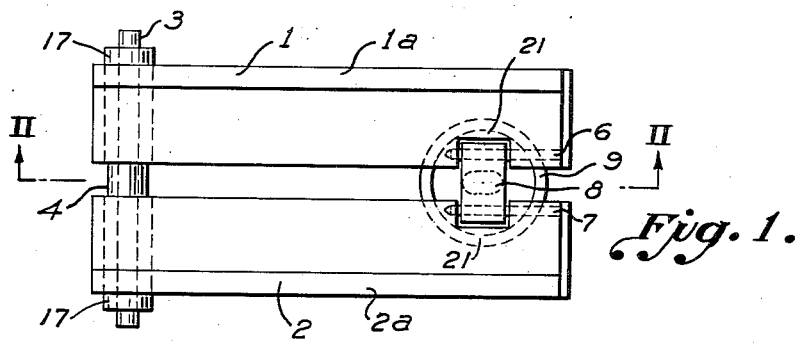
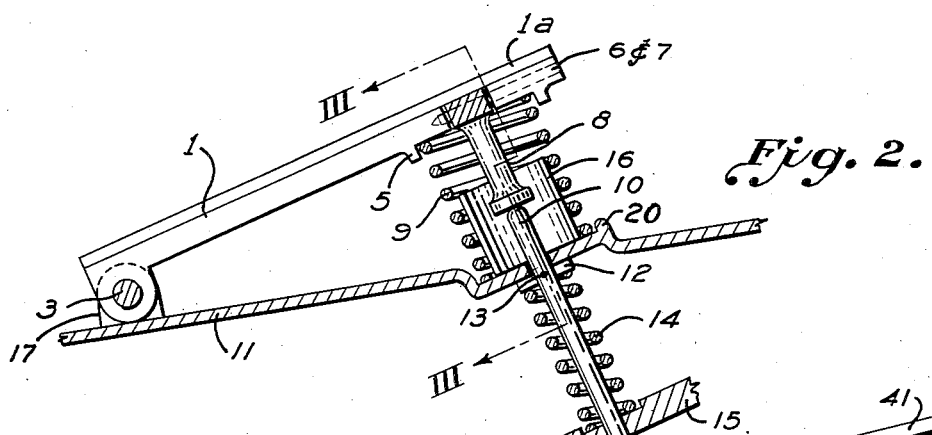
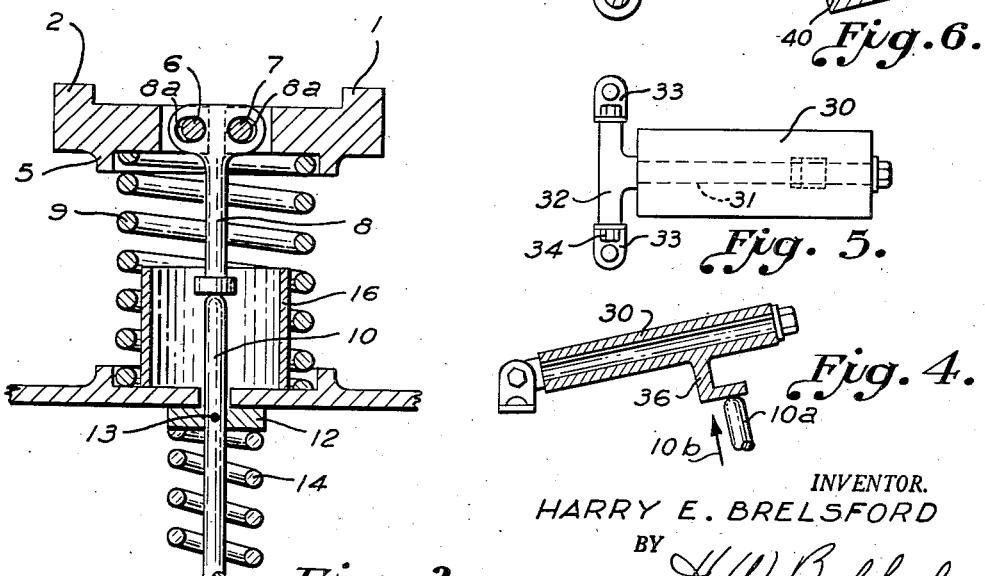
INVENTOR.
HARRY E. BRELSFORD
BY
H. W. Brelsford
ATTORNEY United States Patent Office 2,827,800
Patented Mar. 25, 1958

2,827,800

SAFETY CONTROL PEDAL

Harry E. Brelsford, Mount Dora, Fla., assignor to Harry W. Brelsford, Santa Barbara, Calif., and Frederick Boynton, Birmingham, Mich., as cotrustees Application July 5, 1956, Serial No. 596,046

8 Claims. (Cl. 74—513)

My invention relates to power control pedals for automotive vehicles and has particular reference to a novel pedal construction that incorporates an effective dead man's control to decelerate the vehicle in the event of disability of the operator.

Many accidents have been caused on the highways and railroads because of sudden sickness or death of the operator, after which the vehicle continues at the same or an increased speed until the impact of a collision stops forward motion. While various controls have been suggested, none of these have proved to be practical. Furthermore, such suggested controls seldom are effective in the case of the intoxicated driver.

I have devised a pedal for normal operation of an automobile or the like which responds also as a dead man's control for the vehicle. This is achieved by requiring sufficient pedal dexterity of the operator so that he must consciously exercise control over his foot to apply power to the vehicle. To this end I have devised an accelerator pedal so constructed that the operator's foot at all times must accurately cover all parts of the pedal, and if he fails to do so then the vehicle decelerates.

It is therefore a general object of my invention to provide a safety pedal for automotive vehicles.

Another object is to provide a multimotion pedal for vehicle power control that requires operator control of all areas of the pedal to effect pedal power control.

Another object is to provide an accelerator pedal for automotive vehicles that acts also as a dead man control effective upon death, illness or intoxication of the driver.

Other objects and advantages of my invention will be apparent in the following description and claims considered together with the drawing forming an integral part of this specification, and in which Fig. 1 is a plan view of a two part accelerator pedal embodying the invention.

Fig. 2 is a sectional view along the line II—II of Fig. 1.

Fig. 3 is a sectional view along the line III—III of Fig. 2.

Fig. 4 is a side view of a modified form of the invention.

Fig. 5 is a top view of the modification of Fig. 4, and

Fig. 6 is a schematic side view of a modification showing individual springs for each pedal part.

In carrying out my invention I employ a pivoted treadle that not only can be depressed downwardly by the foot to control the power of a vehicle, but which also can be rotated about a different axis to cause misalignment with the power control member. The safety function is effected by this second rotation. This rotation may be actual in the case of a treadle formed of a single structural member, or may be effective rotation by the unequal depression of a plurality of closely aligned foot levers.

Referring to Figs. 1 through 3, the treadle may include a pair of aligned foot levers 1 and 2 pivoted at points adjacent by a transverse pin 3 to a stationary member 11 (which may be a floor board) from which may project upwardly support lugs 17. This common pivot axis for both levers 1 and 2 permits them to be rotated in parallelism if the angle of rotation is the same for both. The levers 1 and 2 may have raised side flanges 1a and 2a respectively to present a small area of foot bearing and thereby cause uneven angular advance of the levers with just a small amount of foot tilting. These raised edges tend to increase sensitivity.

The levers 1 and 2 are notched at 21 and pins 6 and 7 may pass from the end of the levers across these notches in a direction transverse to the pivot pin 3. Suspended from these two pins 6 and 7 may be an actuator member 8 in the nature of a readily tiltable post. In its normal position the actuator 8 may abut a control rod 10 for the motor of the vehicle which is moved axially of its length to apply more or less power to the vehicle. For example, the rod 10 may be the conventional throttle operating rod found in present day automobiles.

The stationary member 11 may be provided with a shallow ring 20 which acts as the positioner or locator for a helical spring 9, the upper end of which may bear against the pedal levers 1 and 2. This spring is preferably of a dimension with respect to its height and of a resiliency that gives rise to easy distortion of the spring, that is, one side of the top revolution of the spring may be depressed without depressing the opposite side of the same revolution. Such springs are known as "soft" or "flappy" springs which may nevertheless have substantial over-all resistance to over-all compression. A tubular collar 16 may be fitted within the lower part of the spring 9 to prevent entanglement of the actuator 8 with the coils of the spring.

Suitable means for urging the control rod upwardly may be employed as in conventional automobiles and there is illustrated for this purpose a compression spring 14 with its lower end bearing against a guide plate 15 and its upper end bearing against a collar 12 pinned to the rod 10 by a transverse pin 13. The spring 14 may be located anywhere along the line of control between the rod 10 and the throttle or power regulator.

In the operation of the device of Figs. 1 through 3 it is important that the holes in the actuator 8 for receiving the pins 6 and 7 are oval shaped in cross section so that there is permitted a sliding motion between the pins and the actuator as well as a rotative motion. This is illustrated best in Fig. 3 at 8a. The operator must place a foot upon both levers 1 and 2 and must depress them the same amount so that they will be in parallelism at all times. In this connection it will be noted that the levers 1 and 2 are separated from each other by a spacer tube 4 so that the distance between them is a predetermined small space less than the normal width of an operator's foot. When both levers 1 and 2 are depressed together the actuator 8 abuts the control rod 10 as illustrated and forces the control rod 10 downwardly applying power to the motor of the vehicle in which the pedal structure is located.

If, during operation, the operator should be stricken with a heart attack or otherwise become incapacitated or disabled it will be beyond his physical capacity to accurately maintain pressure on both levers 1 and 2 and thereupon he may depress one without depressing the other. As illustrated best in Fig. 3 this will cause a rotative motion of the actuator 8 causing its lower end to come out of abutment with the control rod 10 whereupon the control rod 10 will be permitted to move axially, removing the power from the motor of the vehicle. This rotative motion of the actuator 8 is accommodated by the slots 8a as the levers 1 and 2 assume different elevations in Fig. 3.

To restore the device to an operative condition the operator must release all pressure upon both levers 1 and 2 permitting the spring 9 to move both levers 1 and 2 to their maximum height whereupon the actuator 8 will clear the control rod 10 to resume its normal abutting relationship. Thereafter, the pedal may be used as described for its normal action.

Illustrated in Figs. 4 and 5 is a modification of the invention wherein the two directions of motion are obtained from a single pedal member 30 that is mounted on a lengthwise spindle 31 secured to a lever shaft 32 by means of a T-shaped connection or the equivalent. The lever shaft 32 may be suitably mounted to a stationary member (not shown) as by brackets 33 to which it is retained by suitable fasteners such as nuts 34. Depending from the underside of the lever 30 may be an L-shaped member 36 which may engage a control rod 10a when the lever or pedal 30 is retained in a plane aligned with the lever shaft 32. If, however, the operator places more weight on one side of the spindle 31 than the other, then the L-shaped member 36 will be rotated out of alignment with the control rod 10a and the control rod 10a will move upwardly under the influence of a suitable biasing means as shown by the arrow 10b. In this manner the desired deceleration of the vehicle is obtained when the operator is unable to devote sufficient pedal dexterity to the operation of the vehicle.

Illustrated in Fig. 6 is a modification of the invention wherein multiple pedal parts, such as those illustrated in Figs. 1 through 3, are urged upwardly by means of individual springs. Accordingly, a stationary member 40 may have a pedal 41 pivoted thereto by a pivot 42 (means not shown) and this pedal part 41 may be rotated counterclockwise by means of an individual compression spring 43 disposed between the stationary member 40 and the pedal 41.

It is apparent from the foregoing description of my invention that it provides a dead man control which is effective in the case of severe illness or death of the operator to reduce the power of the vehicle motor so that it will slow down and eventually come to rest without the violent impact of a high speed collision. This mechanism is operative also in the event the driver is intoxicated or under the influence of narcotics, or is otherwise unable to concentrate sufficiently upon the operation of the pedal to keep power applied to the motor. In this case also, the power will be released.

It will be obvious to those skilled in the art that various modifications could be made in the invention without departing from the true spirit and scope of the invention. For example, the release of power on the control rod could be combined with a braking action to apply brakes to the vehicle to bring it to a complete rest. Various other types of actuators could be devised. Accordingly, I do not limit myself to the disclosed embodiment nor otherwise, but include within the claims hereof all such modifications and variations that fall within the true spirit and scope of my invention.

I claim:

1. A power control pedal for automotive vehicles for actuating a rod controlling a power mechanism comprising: a treadle; means permitting pivoting of the treadle about an axis; means permitting effective rotation of the treadle about a second axis parallel to the plane of the treadle; and an actuator connected to the treadle to project therefrom at a predetermined angle and contacting the control rod in the normal position of the treadle, whereby said treadle is operable to actuate the control rod when maintained at a normal position with respect to said second axis.

2. A power control pedal as set forth in claim 1 wherein the treadle is constructed of a plurality of aligned levers to which the actuator is connected.

3. A power control pedal as set forth in claim 1 wherein the treadle is constructed of a single lever.

4. A power control pedal for automotive vehicles for actuating a rod controlling a power mechanism comprising: a pair of aligned foot levers; means permitting pivoting of said levers at points adjacent each other to give parallel alignment for equal angular movement and providing a spacing between said levers that is less than the width of an operator's foot; an actuator for engaging and moving the control rod; means flexibly connecting the actuator to both foot levers to maintain a fixed angular relation thereto when the foot levers are parallel and to change the angular relation thereto when the foot levers are not parallel; and resilient means normally biasing both foot levers to a rest position and yielding elastically to permit pedal rotation in one direction about the pivot, said actuator moving the rod when the foot levers are parallel and failing to move the rod when they are substantially out of parallel.

5. A power control pedal as set forth in claim 4 wherein the actuator is a pendant member connected to the foot levers to angularly swing about an axis transverse to the pivot axes of the foot levers.

6. A dead man safety pedal comprising: a pair of foot levers pivoted on a common axis for parallel movement and spaced from each other so that both can be moved by the foot of an operator; spring means biasing both levers against the weight of the operator's foot; and a pendant actuator pivoted to both foot levers on pivot axes transverse to the common pivot axis.

7. A dead man safety pedal for a vehicle having a control rod comprising: a floor board; a pair of foot levers pivoted to the floor board on a common axis for parallel movement and spaced from each other by a distance not greater than the width of an operator's foot; a soft, easily distorted helical compression spring disposed between the floor board and the foot levers; and a pendant actuator having parallel slots through one end having an elongated cross section; and a pin mounted on each foot lever and generally transverse to the pivot axis and passing through the slots of the actuator, whereby uneven rotation of the foot levers causes swinging of the pendant actuator so that it will be moved out of abutment with a control rod for the vehicle power.

8. A dead man safety pedal for a vehicle having a control rod adapted to be mounted on a stationary member comprising: a T-shaped member; means pivoting the short arm of the T to the stationary member; a single piece treadle pivoted on the long arm of the T member; and an L-shaped actuator secured to the underside of the treadle at the top of the L, whereby a control rod may be contacted by the horizontal portion of the L-shaped actuator when the treadle is in a normal position on the second pivot and can be rotated out of contact by the operator.

References Cited in the file of this patent

UNITED STATES PATENTS

| | | |
|---|---|---|
| 1,857,905 | Wilderson | May 10, 1932 |
| 1,890,544 | Hull | Dec. 13, 1932 |
| 2,369,056 | Langdon et al. | Feb. 6, 1945 |
| 2,603,320 | Werther | July 15, 1952 |

FOREIGN PATENTS

| | | |
|---|---|---|
| 1,107,083 | France | Aug. 3, 1955 |